(12) United States Patent
Steeves et al.

(10) Patent No.: US 12,210,815 B2
(45) Date of Patent: Jan. 28, 2025

(54) IDENTIFICATION OF DOCUMENT ACCESS BY A MESSAGE SCANNING SYSTEM

(71) Applicant: DocuSign, Inc., San Francisco, CA (US)

(72) Inventors: David Steeves, Bainbridge Island, WA (US); Andrew Charles Pope, Fox Island, WA (US); Michael William Cummings, Redmond, WA (US); Thomaz DeSouza, North Bend, WA (US); Nicholas Mitchell, Seattle, WA (US)

(73) Assignee: DOCUSIGN, INC., San Francisco, CA (US)

( * ) Notice: Subject to any disclaimer, the term of this patent is extended or adjusted under 35 U.S.C. 154(b) by 162 days.

(21) Appl. No.: 17/581,181

(22) Filed: Jan. 21, 2022

(65) Prior Publication Data

US 2023/0237245 A1    Jul. 27, 2023

(51) Int. Cl.
*G06F 40/123* (2020.01)
*G06F 21/62* (2013.01)
*G06F 40/134* (2020.01)
*H04L 9/08* (2006.01)
*H04L 9/40* (2022.01)

(52) U.S. Cl.
CPC ......... *G06F 40/123* (2020.01); *G06F 21/62* (2013.01); *G06F 40/134* (2020.01); *H04L 9/0825* (2013.01); *H04L 63/0442* (2013.01)

(58) Field of Classification Search
CPC ... G06F 40/123; G06F 40/134; H04L 9/0825; H04L 63/0442
See application file for complete search history.

(56) References Cited

U.S. PATENT DOCUMENTS

| | | | |
|---|---|---|---|
| 7,660,798 B1 * | 2/2010 | Ludwig | G06F 21/6209 713/165 |
| 7,966,492 B1 * | 6/2011 | Gasparini | H04L 63/083 713/168 |
| 8,112,814 B2 * | 2/2012 | Shimizu | G06F 21/53 713/182 |
| 8,365,271 B2 * | 1/2013 | Blum | H04L 67/563 713/153 |
| 9,237,019 B2 * | 1/2016 | Roth | H04L 63/10 |
| 9,819,654 B2 * | 11/2017 | Roth | H04L 63/102 |
| 10,013,567 B2 * | 7/2018 | Hornquist Astrand | H04L 63/10 |
| 10,212,166 B2 * | 2/2019 | Xie | G06F 21/33 |

(Continued)

*Primary Examiner* — Benjamin Smith
(74) *Attorney, Agent, or Firm* — Shumaker & Sieffert, P.A.

(57) ABSTRACT

Information identifying a message scanning system is encoded into URLs. A document management system can decode the identifying information to verify that a document accessed via a URL was accessed by a trusted entity rather than by an unknown user. The document management system sends a message including a URL to access a document. When a message scanning system known to the document management system reviews the message for threats, it encodes its identity into a modified form of the URL in the message and uses the modified URL to access the resource. The document management system can decode the identity of the messaging system using a decoding key. Based on the identification, the document management system updates records associated with the document to include the document acce by the message scanning system.

14 Claims, 5 Drawing Sheets

(56) References Cited

U.S. PATENT DOCUMENTS

| | | | | |
|---|---|---|---|---|
| 10,257,171 B2* | 4/2019 | Lyons | | H04L 63/0442 |
| 10,360,389 B2* | 7/2019 | Ali | | G06F 40/10 |
| 10,412,059 B2* | 9/2019 | Roth | | H04L 67/02 |
| 10,516,653 B2* | 12/2019 | Deriso | | H04L 9/3242 |
| 10,708,244 B2* | 7/2020 | Hathaway | | H04L 63/0471 |
| 11,050,572 B2* | 6/2021 | Steele | | H04L 9/3239 |
| 11,146,538 B2* | 10/2021 | Roth | | H04L 63/102 |
| 11,159,330 B1* | 10/2021 | Tian | | G06F 3/0481 |
| 11,165,579 B2* | 11/2021 | Ferenczi | | H04L 9/3213 |
| 11,184,336 B2* | 11/2021 | Deriso | | H04L 9/3263 |
| 11,283,793 B2* | 3/2022 | Khanna | | H04L 9/3228 |
| 11,308,228 B1* | 4/2022 | Tian | | G06Q 20/3674 |
| 11,405,400 B2* | 8/2022 | Gazit | | H04L 63/1425 |
| 11,456,998 B2* | 9/2022 | Hathaway | | H04L 63/0442 |
| 11,658,829 B1* | 5/2023 | Tian | | H04L 9/3247 |
| | | | | 713/176 |
| 11,727,130 B1* | 8/2023 | Tian | | G06Q 20/3255 |
| | | | | 705/59 |
| 2008/0235765 A1* | 9/2008 | Shimizu | | G06F 21/53 |
| | | | | 726/2 |
| 2009/0217354 A1* | 8/2009 | Blum | | H04L 63/10 |
| | | | | 726/3 |
| 2015/0089233 A1* | 3/2015 | Roth | | H04L 63/102 |
| | | | | 713/168 |
| 2016/0127330 A1* | 5/2016 | Roth | | H04L 67/02 |
| | | | | 713/168 |
| 2016/0217294 A1* | 7/2016 | Hornquist Astrand | | H04L 63/06 |
| 2016/0300223 A1* | 10/2016 | Grey | | G06Q 20/3825 |
| 2016/0323107 A1* | 11/2016 | Bhogal | | H04W 12/10 |
| 2016/0323108 A1* | 11/2016 | Bhogal | | H04W 12/08 |
| 2017/0070486 A1* | 3/2017 | Lyons | | H04L 63/061 |
| 2017/0098090 A1* | 4/2017 | Ali | | H04L 63/105 |
| 2017/0111362 A1* | 4/2017 | Xie | | H04L 63/101 |
| 2018/0007021 A1* | 1/2018 | Deriso | | H04L 63/0442 |
| 2018/0041480 A1* | 2/2018 | Roth | | H04L 63/0428 |
| 2018/0359222 A1* | 12/2018 | Hathaway | | H04L 63/045 |
| 2019/0068560 A1* | 2/2019 | Roth | | H04L 63/123 |
| 2020/0084190 A1* | 3/2020 | Deriso | | H04L 9/3242 |
| 2020/0128002 A1* | 4/2020 | Khanna | | H04L 9/3228 |
| 2020/0382474 A1* | 12/2020 | Hathaway | | H04L 63/168 |
| 2021/0067340 A1* | 3/2021 | Ferenczi | | H04L 9/30 |
| 2021/0075794 A1* | 3/2021 | Gazit | | H04L 63/1408 |
| 2022/0335414 A1* | 10/2022 | Murray | | G06Q 20/3674 |

* cited by examiner

400

Sending a message to a user using a messaging system, the message including a first URL that can be used to access a document.
410

Receiving an indication that the document associated with the first URL has been accessed, wherein the indication comprises a second URL generated by a message scanning system that has analyzed the message, the second URL including a coded value that is encoded using an encoding key associated with the message scanning system.
420

Decoding the coded value to determine the identity of the message scanning system using a decoding key associated with the message scanning system.
430

Responsive to determining the identity of the message scanning system from the coded value, modifying an interface including records of attempts to access the document to include a representation of the access by the message scanning system and to include the identity of the message scanning system.
440

FIG. 4

IDENTIFICATION OF DOCUMENT ACCESS BY A MESSAGE SCANNING SYSTEM

TECHNICAL FIELD

The disclosure generally relates to the field of resource management, and specifically to verifying document accesses by trusted third-party systems.

BACKGROUND

Document management systems track when an online document has been accessed. However, when multiple parties have access to a document via the same link, it can be difficult to determine who accessed and interacted with the document. Sometimes this can lead to confusion when a document access is recorded but the main user associated with the document has never opened the document. Thus, it would be beneficial for trusted third party entities to be able to indicate to a document management system that they had accessed a document.

SUMMARY

A document management system sends messages to a user using a messaging system, such as email. The messages include a uniform resource locator (URL), often in the form of a link, that the user can use to access an online document. When the message is received for the user by a messaging system, a message scanning system (such as a URL scanning system) may have access to messages at the messaging system for the purposes of scanning the messages for security threats. The message scanning system accesses the document via the URL in the message to test the URL. Prior to accessing the URL, the message scanning system modifies the URL with an annotation that includes a coded value that identifies the message scanning system to the document management system, but that cannot be faked by a bad actor.

Since the URL is modified by the message scanning system such that it still accesses the same resource, the document management system receives an indication that the document associated with the URL in the message has been accessed when the message scanning system follows the modified URL. The document management system decodes the coded value in the modified URL using a decoding key that is known by the document management system to be associated with the message scanning system. Once the document management system determines the identity of the message scanning system from the coded value, the document management system can update records associated with the document to log the document access by the message scanning system. This may also show up in interfaces that can display logs of document interactions to a user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates an example process for modifying URLs to indicate an identity of a scanning system that accessed the URL, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

A document management system can decode identifying information included in URLs of scanned messages to verify that a document accessed via a URL was accessed by a trusted entity rather than by an unknown end user, IP address, or client. The document management system sends a message including a URL to access a document. A message scanning system known to the document management system modifies the URL by encoding its identity into the URL (e.g., by adding URL parameters). The message scanning system then accesses the document via the modified URL to scan the document, such as by reviewing the message for threats. The document management system receives the modified URL when the document is accessed (e.g., via a web server) and can decode the identity of the message scanning system from the modified URL using a decoding key. Based on the identification, the document management system may update records associated with the document to include the document access by the message scanning system.

The system environment described herein can be implemented for an online document system, a document execution system, or any type of resource management system that uses URLs or uniform resource identifiers (URIs) for accessing resources. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Figure 1:
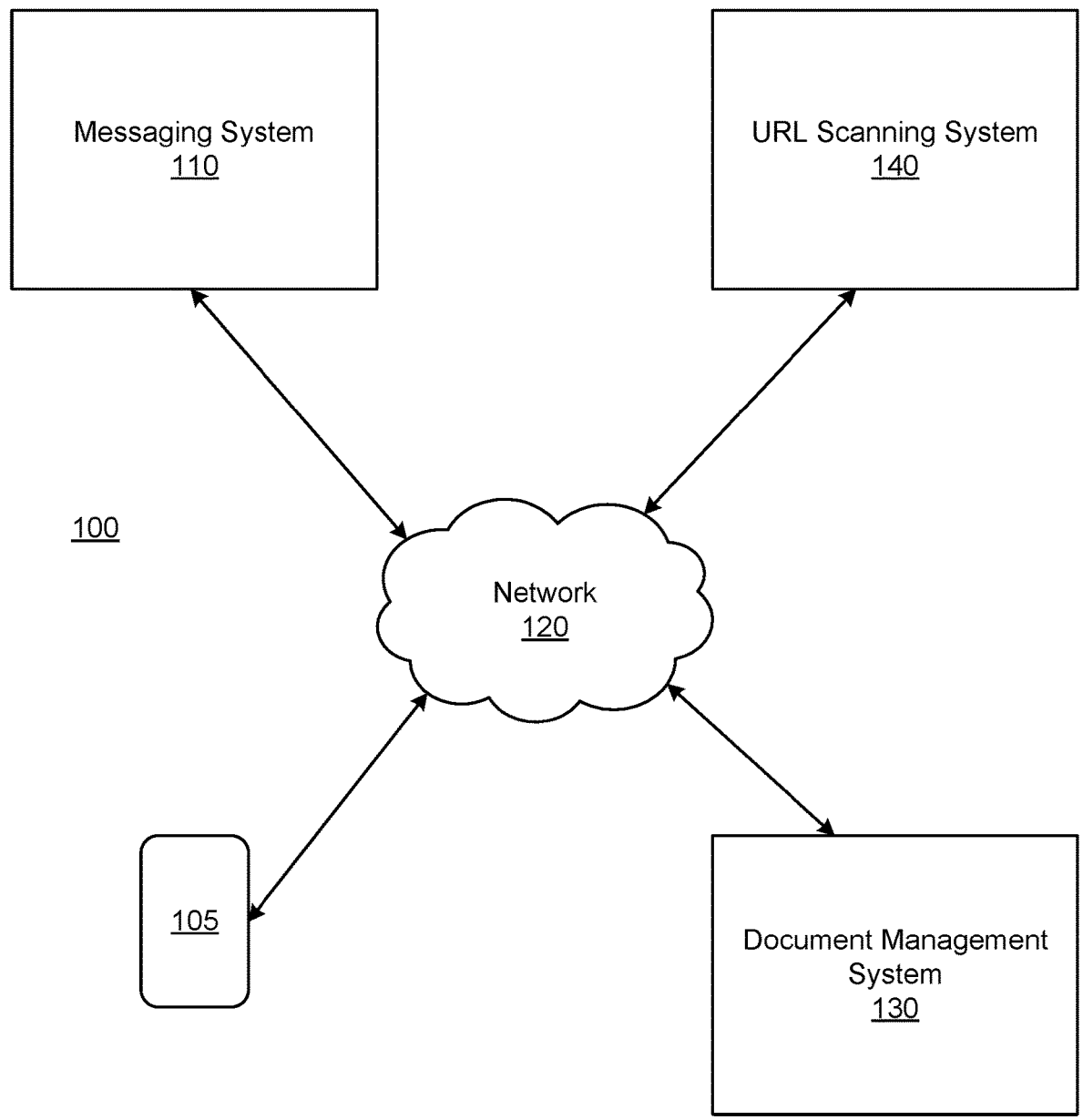
FIG. 1 illustrates a system environment in which documents are sent for review by users of a messaging system, in accordance with an example embodiment.

FIG. 1 illustrates a system environment 100 in which documents are sent for review by users of a messaging system, in accordance with an example embodiment. The system environment 100 allows a document management system 130 to send documents to a messaging system 110 where they can be accessed and reviewed by a user. The system environment 100 additionally enables verification, by the document management system 130 of document accesses that are made by the user or by other third party systems, such as a uniform resource locator (URL) scanning system 140. As illustrated in FIG. 1, the system environment 100 includes a client device 105, a messaging system 110, a document management system 130, and a URL scanning system 140, each communicatively interconnected via a network 120. In some embodiments, the system environment 100 includes components other than those described herein. For the purposes of concision, web servers, data centers, and other components associated with an online system environment are not shown in the embodiment of FIG. 1.

The client device 105 is a device by which a user can communicate with the messaging system 110. In some embodiments, the client device 105 can provide documents to the document management system 130 for analysis or storage (or may provide instructions to create documents). The client device 105 is a computing device capable of transmitting or receiving data over the network 120. The client device 105 enables a user to access messages at the messaging system 110. The client device 105 may also enable a user to create or provide documents to the document management system 130, or to access documents stored at the document management system 130. In some embodiments, the messages accessed by the client device 105 include the ability to view, review, edit and/or sign a document from the document management system 130.

The document management system 130 can be a server, server group or cluster (including remote servers), or another suitable computing device or system of devices. In some implementations, the document management system 130 can communicate with messaging systems (e.g., the messaging system 110) and client devices (e.g., the client device 105) over the network 120 to receive and provide information (e.g., documents or document analyses). It should be noted that although examples are sometimes given herein in the context of documents for analysis, the document management system 130 can coordinate the creation, viewing, editing, analyzing, and signing of any number of documents (e.g., thousands, millions, and more) for any number of users or accounts, and for any number of entities or organizations.

The messaging system 110 can be a server, server group, or cluster (including remote servers), or another suitable computing device or system of devices. In some embodiments, the messaging system 110 stores messages and facilitates messaging services, such as email and texting. For example, the messaging system 110 may be an email server in one embodiment. The messaging system 110 can receive messages containing URLs that link to document resources from the document management system 130. Additionally, the messaging system 110 can receive messages containing documents and document information from the document management system 130 and the messaging system 110 also allows a user at a client device 105 to access messages.

The URL scanning system 140 analyzes messages to verify their authenticity and safety for users. The URL scanning system 140 may be a third party system that is not affiliated with the document management system 130. For example, the URL scanning system 140 may be an email defense service that provides email scans for phishing messages and unsafe links embedded in emails. In some embodiments, the URL scanning system 140 may be a part of the messaging system 110. A URL scanning system 140 can function as a known entity to the document management system 130, and the document management system can determine that it is a verified system when it accesses document links for the purposes of scanning them. The URL scanning system can be a server, server group, or cluster (including remote servers), or another suitable computing device or system of devices.

The network 120 transmits data within the system environment 100. The network 120 may be a local area or wide area network using wireless or wired communication systems, such as the Internet. In some embodiments, the network 120 transmits data over a single connection (e.g., a data component of a cellular signal, or Wi-Fi, among others), or over multiple connections. The network 120 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2A:
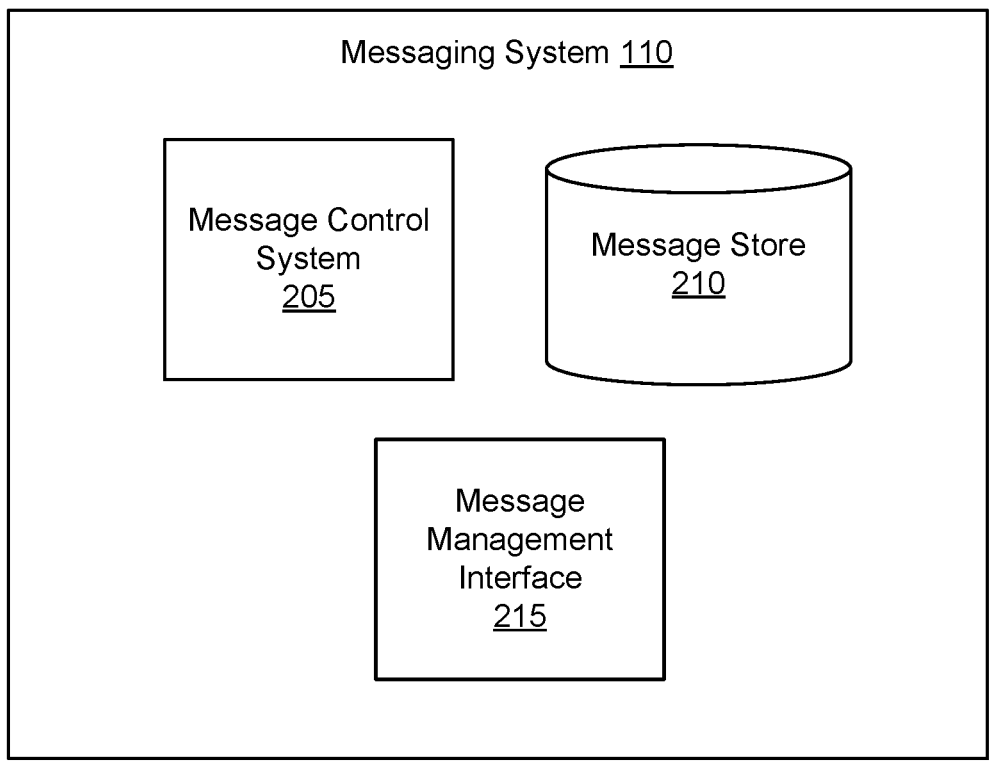
FIG. 2A is a high level block diagram illustrating a system architecture of the messaging system, in accordance with an example embodiment.

FIG. 2A is a high level block diagram illustrating a system architecture of the messaging system 110, in accordance with an example embodiment. The messaging system 110 stores messages for access by users (e.g., via client devices 105) and can also generate and send messages for users. In one embodiment, the messaging system 110 is an email server or another kind of email system. The messaging system 110 may receive messages from many other entities, including from the document management system 130. Messages from the document management system 130 can include URL links that allow a user receiving the message to access the document or other resources over the network 120 and to interact with the document. The messaging system 110 includes a message control system 205, a message store 210, and a message management interface 215. Computer components such as network interfaces, security functions, load balancers, failover servers, management and network operations consoles, and the like are not shown so as to not obscure relevant details of the system architecture. Additionally, the messaging system 110 may contain more, fewer, or different components than those shown in FIG. 2A and the functionality of the components as described herein may be distributed differently from the description herein.

The message control system 205 is a message system that facilitates message transmission. In one embodiment, the message control system 205 receives emails that are sent to users associated with the messaging system 110. Likewise, the message control system 205 can generate and send emails to other users. As an example, a user of a client device (e.g., client device 105) can access their emails that are hosted on a messaging system 110.

The message store 210 stores the messages received at the messaging system 110 by the message control system 205. The message store 210 may additionally store sent messages or draft messages that a user has yet to send. In some embodiments, the message store 210 also stores metadata about the messages, such as time stamps and recipient addresses.

The message management interface 215 reviews the content of messages and can interact with the URL scanning system 140 to facilitate review of URLS contained in messages. In one embodiment, the messaging system 110 includes an application programming interface (API) that allows various other systems and users to read messages and perform analysis of the messages and their contents. The URL scanning system 140 can use the functionalities of the messaging system 110 API that is managed by the message management interface 215 to identify and obtain URLs contained in messages at the messaging system 110. In alternate embodiments, the message management interface 215 may include software, associated with the URL scanning system 140, that can scan the content and metadata of messages stored in the message store 210 and may send the retrieved information to the URL scanning system 140 for further analysis.

Figure 2B:
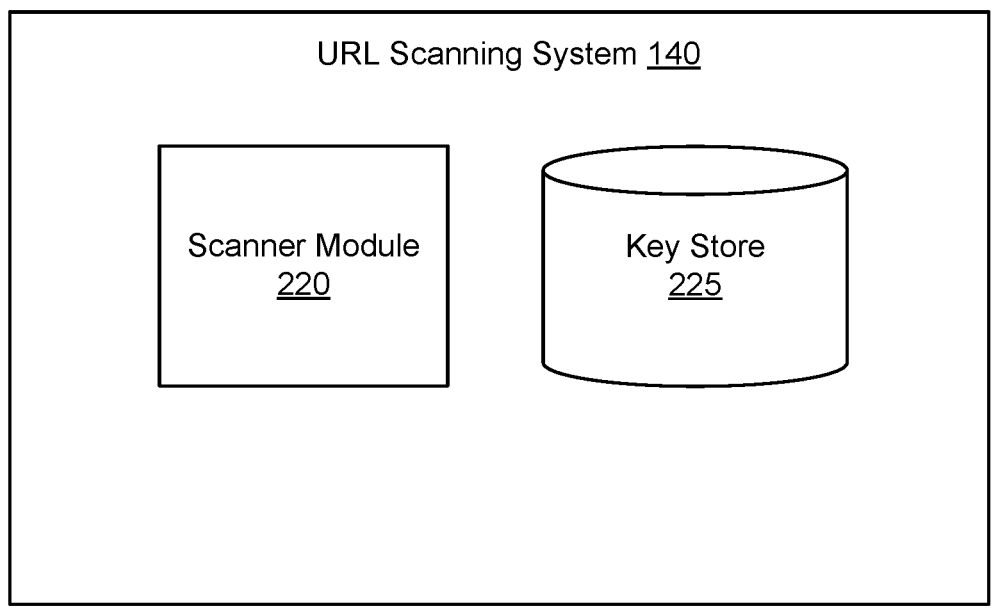
FIG. 2B is a high level block diagram illustrating a system architecture of the URL scanning system, in accordance with an example embodiment.

FIG. 2B is a high level block diagram illustrating a system architecture of the URL scanning system 140, in accordance with an example embodiment. The URL scanning system 140 may be a part of a message analysis system that can review and scan the content of messages to determine information about the authenticity and the safety of the messages. For example, the URL scanning system may be an aspect of a service that is provided by a security organization to messaging systems or end users to scan software on machines for computer viruses and to determine the safety of links sent in messages such as emails and texts. The URL scanning system 140 obtains receives information about URLs in messages using functions of the API that is hosted at the message management interface 215 of the messaging system 110. In some embodiments, the API is configured to manage access to messages and message content (e.g., for use by administrators or developers of the messaging system 110). The URL scanning system 140 then performs tests on the URLs to determine whether they are safe for a user to access. To identify itself as a trusted entity to the document management system 130, the URL scanning system 140 modifies each URL prior to accessing it so that the document management system 130 will see the modified URL (including an encoded identifier of the URL scanning system 140) when the document resource is accessed. The URL scanning system 140 includes a scanner module 220 and a key store 225. Computer components such as web servers, network interfaces, security functions, load balancers, failover servers, management and network operations consoles, and the like are not shown so as to not obscure the details of the system architecture. Additionally, the URL scanning system 140 may contain more, fewer, or different components than those shown in FIG. 2B and the functionality of the components as described herein may be distributed differently from the description herein.

The scanner module 220 reviews URLs from messages, as obtained via the API of the message management interface 215, to identify security issues that may be associated with the URLs. In one embodiment, the scanner module 220 analyzes each received URL to determine whether the URL would direct a user to a suspicious website or whether the URL may cause the user device 105 or messaging system 110 to be compromised. For example, the scanner module 220 may be searching for known or likely phishing attempts. The scanner module 220 may employ different techniques to analyze a URL, such as accessing the URL in a sandbox system or comparing the URL against lists of known good URLs and known bad URLs.

Before accessing a URL for analysis, the scanner module 220 modifies the URL such that the modified URL includes a value that will identify the URL scanning system 140 to the document management system 130. The modified URL is generated so that it will still access the same resource, but it will include the additional identifying value. For example, the URL scanning system 140 can add a parameter value to the URL, thus including the identifying value without compromising the URL path to the resource. When the scanner module 220 then performs tests on the modified URL, such as by accessing the modified URL in a sandbox system, the web server of the document management system 130 will receive the URL path including the parameter value that identifies the messaging system 110. Additional information about the generation of a modified URL is included in the description of FIG. 3.

The key store 225 stores an encoding key. The encoding key may be used by the scanner module 220 to encode the identifying parameter value before it is included in the modified URL. In some embodiments, the encoding key may be a private key that was generated for the URL scanning system 140 by the document management system 130. In such cases, the document management system 130 may hold a corresponding public key that allows the parameter value to be decoded by the document management system 130 to verify the identity of the entity that accessed the message containing the URLs. In other embodiments, the URL scanning system 140 and the document management system 130 share a symmetric key which is stored in the key store 225 and used by the scanner module 220 to encode the identifying value for inclusion in the modified URL parameter and which is used by the document management system 130 to decode the identifying value for verification. In still another embodiment, the URL scanning system 140 may publish a public key for many systems to use for validation, for example, as part of the URL scanning services domain name system (DNS) records. The document management system 130 may then use the published public key of the URL scanning system 140 to decode the parameter value and identify the URL scanning system 140.

Figure 2C:
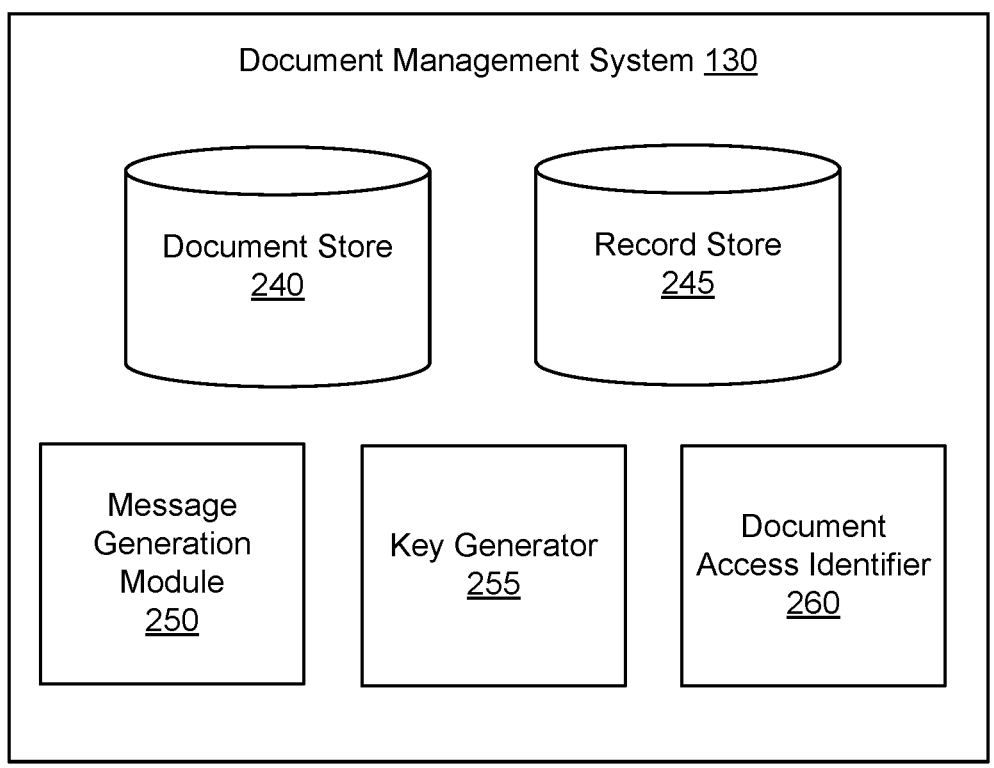
FIG. 2C is a high level block diagram illustrating a system architecture of the document management system, in accordance with an example embodiment.

FIG. 2C is a high level block diagram illustrating a system architecture of the document management system 130, in accordance with an example embodiment. The document management system 130 analyses documents, coordinates document creation, facilitates document viewing and editing, and enables execution of documents that include signatures. With respect to the present disclosure, the document management system 130 also generates and sends messages that include URL links to documents or to information about documents. Thus, a user, via a client device 105, can access a message at the messaging system 110 that was sent by the document management system 130, and can use a link in the message to access a document (e.g., for review or signature).

The document management system 130 includes a document store 240, a record store 245, a message generation module 250, a key generator 255, and a document access identifier 260. Computer components such as web servers, network interfaces, security functions, load balancers, failover servers, management and network operations consoles, and the like are not shown so as to not obscure the details of the system architecture. Additionally, the document management system 130 may contain more, fewer, or different components than those shown in FIG. 2C and the functionality of the components as described herein may be distributed differently from the description herein.

The document store 240 stores documents and document metadata for the document management system 130. A corpus of documents stored in the document store 240 may include documents provided by one or more parties, such as a user associated with the client device 105. The document corpus may additionally include various information describing documents or clauses of documents. Examples of documents stored in the document store 240 include but are not limited to: a sales contract, a permission slip, a rental or lease agreement, a liability waiver, a financial document, an investment term sheet, a purchase order, an employment agreement, a mortgage application, and so on. Each document can include one or more clauses. Clauses are portions of a document, and may include text, images, or other material of any length. In some embodiments, a clause corresponds to a legal clause, a business clause, financial agreement text, and the like. For example, a given document in the document store 240 may include multiple clauses that each correspond to a different header within the document. Clauses may further be associated with one or more clause types that characterize content of clause as corresponding to a particular category of the clause. Examples of clause types include but are not limited to an indemnity clause, a merger and integration clause, a severability clause, a fees clause, a damages clause, a pricing clause, a purchase clause, a payment clause, and so on. It should be noted that not every portion of a document or of text within a document may be considered a "clause" for the purposes of the description here. When a change is made to a document, either by the document management system 130 or by a user of a client device 105, the document data is updated in the document store 240. In some embodiments, the document store 240 also stores versions of documents as they are edited and changed over time.

The record store 245 stores records of interactions that have occurred with documents store 240. In some embodiments, such a record for a document may be referred to as a "document envelope." A record in the record store 245 may include information about the identities of users and entities who have accessed the document, actions taken with respect to the document (e.g., signatures, edits, read-only accesses, etc.), document version history, and other metadata associated with the storage and history of a document. In some embodiments, the information of the record store 245 and the document store 240 is stored in the same database. When the document management system determines, via an encoded parameter value in a modified URL, that the URL scanning system 140 has accessed a document (e.g., during a message security scan), the record store 245 updates the record associated with that document to indicate that the known URL scanning system 140 accessed the document for a security scan. Similarly, if a user who receives the message about the document accesses the document, the record store 245 will update to indicate that there was an access of the document associated with that user. If a document is accessed and the identity of the accessor cannot be verified by the document management system, this unauthorized or suspicious access will also be logged in the record store 245 in association with the document.

In one embodiment, the document management system generates user interfaces that can be accessed by administrators, users, or other entities associated with documents. The user interface for a document may display the records stored in the record store 245 in relation to the document. This allows users and entities associated with a document to track the history of document accesses. Since the URL scanning system 140 is identified when it accesses the modified document link for scanning, the interface may be updated to include a representation of the access by the URL scanning system 140 and to include the identity of the URL scanning system 140.

The message generation module 250 generates messages that include information for a user from the document management system 130. For example, the message generation module 250 may generate email messages. Generating a message may involve combining data relevant to a document and to the target user and including a URL to access the document. Message generation may also include identifying an address (e.g., email address) to which the message is to be delivered. In some embodiments, the message generation module 250 may access information in the record store 220 to determine what information needs to be included in a message, and when to send a message. For example, the record store 220 may include a schedule indicating that a message with a document link should be sent to a specified list of users every week until the users have all signed the document. As another example, the record store may include information about what instructions should accompany a document link in messages for different users (e.g., one message may be sent to a user with a request for a signature on the linked document and another message may be sent to an administrative user reporting that a signature has been requested for the linked document). When a message is generated, the message generation module 250 can transmit the message to the messaging system so that the message (and document link) can be accessed by the user.

The key generator 255 generates keys that are used by the URL scanning system 140 to encode the parameter value for the modified URL and by the document management system 130 to decode the parameter value of a modified URL for verifying the identify of the URL scanning system 140. Entities other than users that may access documents (e.g., for message scanning purposes) can establish themselves as known trusted entities with the document management system 130, for example, by developing an agreement with the document management system 130 organization. In one embodiment, the key generator 255 may generate a unique key pair associated with the new trusted entity. The key generator 255 may generate any type of encoding keys in various embodiments. In one embodiment, the encoding key generated by the key generator 255 is a private key and the decoding key generated by the key generator 255 is a public key and the pair is associated with the URL scanning system 140. The document management system provides the private key to the URL scanning system 140, which stores the private key in the key store 225 and uses the private key to encode the parameter value into modified URLs (i.e., the private key is used to sign the URL with the identity of the URL scanning system 140). The document management system stores the public key in association with the known URL scanning system 140, and can use the public key to decode an encoded parameter value in a modified URL to identify the entity that accessed the document. As discussed in relation to the key store 225 of the URL scanning system 140, alternate embodiments can involve different encoding techniques for the value in the modified URL parameter and may use different key values or the keys may be generated by systems other than the key generator 255.

The document access identifier 260 receives an indication that a document has been accessed and verifies the identify of the user or entity that accessed the document via the URL. In one embodiment, the document access identifier receives an modified URL when a document has been accessed via the modified URL by the scanner module 220. The document access identifier may use a decoding key associated with a known third party system to decode the parameter in the modified URL and receive verification that the access to the document was made by the known third party system and not by another unknown entity. Additional details about verifying the identify of document accesses are included in the descriptions of FIG. 3.

Encoding Identity of Document Access Entity in URLs

Figure 3:
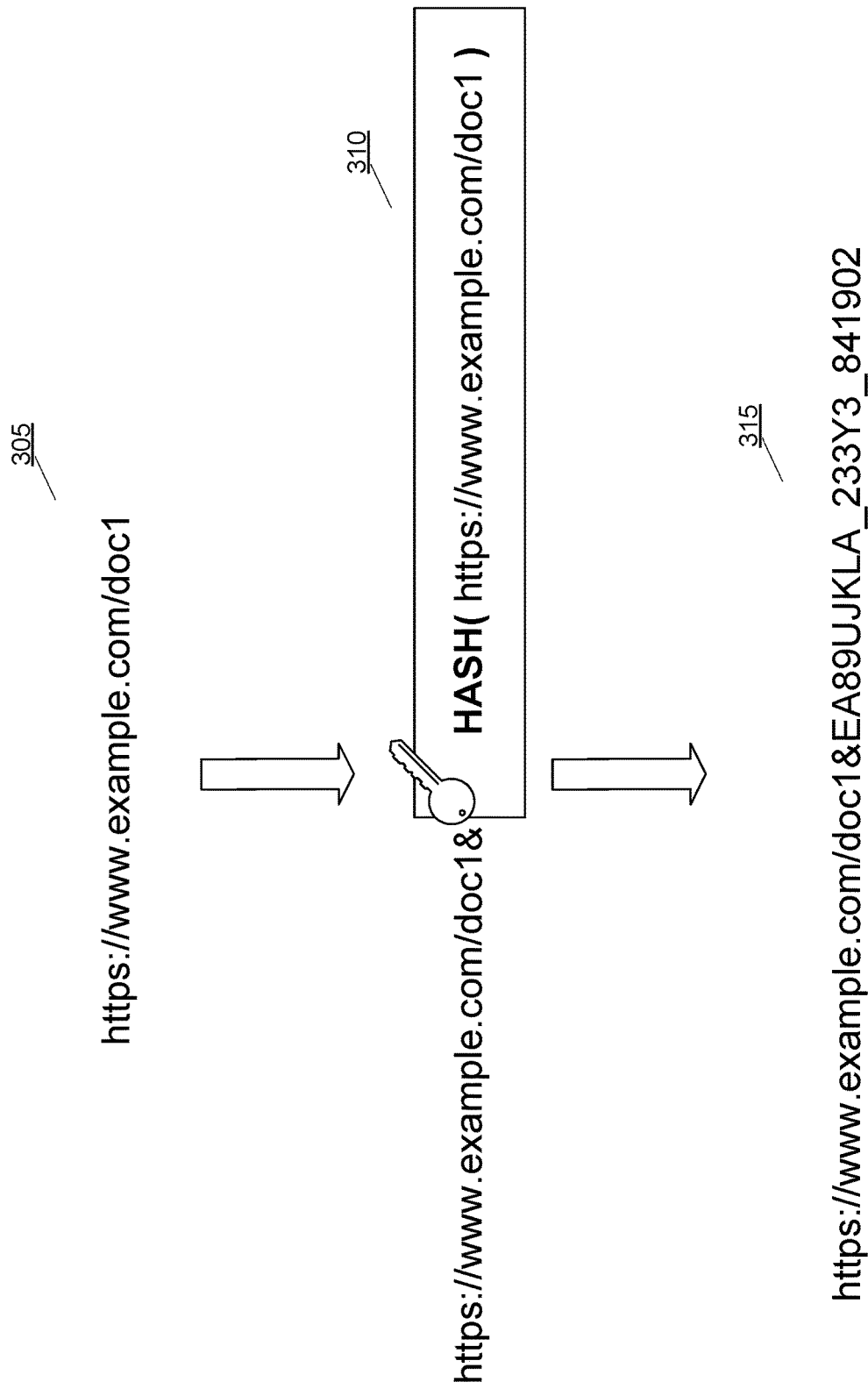
FIG. 3 illustrates an example process of modifying a URL to include an encoded identity of the URL scanning system, in accordance with an embodiment.

FIG. 3 illustrates an example process of modifying a URL to include an encoded identity of the URL scanning system 140, in accordance with an embodiment. In the example of FIG. 3, the process is performed by the scanner module 220 of the URL scanning system 140, although it could be performed by any appropriate system or module in various embodiments.

The scanner module 220 receives a first URL 305 to be analyzed. For example, the URL scanning system 140 may obtain first URL "https://www.example.com/doc1" from a message sent by the document management system 130 to a user account at the messaging system 110. The scanner module 220 generates an encoded parameter value for encoding the identity of the URL scanning system 140. In some embodiments, the encoded parameter value is related to the first URL 305. In other embodiments the encoded parameter value may include a secret code, an account name, an account number, etc.).

In the example of FIG. 3, the encoded parameter value 310 is a hash of the first URL 305 that is then encoded using the encoding key stored by the URL scanning system 140 in the key store 225. In one embodiment, the hashing algorithm is agreed upon by the URL scanning system 140 and the document management system 130 at the time the key values are exchanged. A second URL 315 (i.e., the modified URL) is generated by appending the encoded parameter value 310 to the first URL as a URL parameter. The coded value (i.e., the parameter value) is included in the second URL 315 as a query string parameter such that the second URL 315 will still identify the same document as the first URL (i.e., accessing the second URL 315 will direct a system to the same web or file system location as accessing a link based on the first URL 305). The URL scanning system 140 accesses the resource via the second (modified) URL 315 for analyzing the first URL 305.

Process for Modifying URLs

FIG. 4 illustrates an example process 400 for modifying URLs to indicate an identity of a scanning system that accessed the URL, in accordance with an embodiment. In the embodiment shown in FIG. 4, the process 400 is performed by the document management system 130. In other embodiments, some of all of the steps of the process 400 may be performed by other components of the system environment 100 or may be performed in a different order than that depicted in FIG. 4. Additionally, in other embodiments, the process 400 illustrated in FIG. 4 can include fewer, additional, or different steps from those described herein.

The process 400 includes the document management system 130 sending 410 a message to a user using a messaging system. The message sent by the document management system 140 includes a first URL that can be used to access a document that is hosted by the document management system 130. For example, the document management system 130 may generate and send an email to a user that includes a link to a document, and that requests that the user access the document for review and signature.

The process 400 includes receiving 420, at the document management system 130, an indication that the document associated with the first URL has been accessed. The indication may comprise a second (modified) URL that is generated by a message scanning system (e.g., the URL scanning system 140) that has accessed and analyzed the URL via the second modified URL, such as the URL scanning system 140. The second URL may include a coded value that identifies the particular message scanning system. The coded value in the second URL is encoded using an encoding key associated with the message scanning system 140.

The process 400 includes the document management system 130 decoding 430 the coded value to determine the identity of the message scanning system. The document management system 130 may use a decoding key associated with the message scanning system to decode the coded value.

Responsive to the document management system 130 determining the identity of the message scanning system from the coded value, the process 400 further includes modifying 440 an interface including records of attempts to access the document to include a representation of the access by the message scanning system and to include the identity of the message scanning system.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
generating, by a document management system, a key pair comprising a private key and a public key;
providing, by the document management system, the private key to a message scanning system;
sending, by the document management system, a message to a user using a messaging system, the message including a first uniform resource locator (URL) that can be used to access a document;
receiving, by the document management system, an indication that the document associated with the first URL has been accessed, wherein the indication comprises a second URL generated by the message scanning system that has analyzed the message, the second URL including a coded value that is encoded using the private key and wherein the coded value is included in the second URL as a query string parameter such that the second URL identifies the same document as the first URL and further identifies the message scanning system;
determining, by the document management system and based on the coded value, that the message scanning system has accessed the document, wherein determining that the message scanning system has accessed the document comprises decoding the coded value using the public key and determining an identity of the message scanning system based on the decoded coded value; and
responsive to determining that the message scanning system has accessed the document, modifying, by the document management system, a record associated with the document to indicate that the message scanning system has accessed the document.

2. The method of claim 1, wherein the messaging system comprises an email system.

3. The method of claim 1, wherein the coded value comprises an encoded hash of the first URL.

4. The method of claim 1, wherein the second URL comprises an encoded hash of the first URL appended to the first URL.

5. The method of claim 1, wherein receiving the indication that the document associated with the first URL has been accessed comprises receiving the second URL.

6. Non-transitory computer-readable storage media storing executable instructions that, when executed, cause a computing system to:
generate a key pair comprising a private key and a public key;
provide the private key to a message scanning system;
send a message to a user using a messaging system, the message including a first uniform resource locator (URL) that can be used to access a document;
receive an indication that the document associated with the first URL has been accessed, wherein the indication comprises a second URL generated by the message scanning system that has analyzed the message, the second URL including a coded value that is encoded using the private key and wherein the coded value is included in the second URL as a query string parameter such that the second URL identifies the same document as the first URL and further identifies the message scanning system;
determine, based on the coded value, that the message scanning system has accessed the document, wherein to determine that the message scanning system has accessed the document, the instructions cause the computing system to decode the coded value using the public key and to determine an identity of the message scanning system based on the decoded coded value; and
responsive to a determination that the message scanning system has accessed the document, modify a record associated with the document to indicate that the message scanning system has accessed the document.

7. The non-transitory computer-readable storage media of claim 6, wherein the messaging system comprises an email system.

8. The non-transitory computer-readable storage media of claim 6, wherein the coded value comprises an encoded hash of the first URL.

9. The non-transitory computer-readable storage media of claim 6, wherein the second URL comprises an encoded hash of the first URL appended to the first URL.

10. The non-transitory computer-readable storage media of claim 6, wherein the instructions to receive the indication that the document associated with the first URL has been accessed cause the computing system to receive the second URL.

11. A computing system comprising one or more processors and non-transitory computer-readable storage media storing instructions that, when executed, cause the one or more processors to:
generate a key pair comprising a private key and a public key;
provide the private key to a message scanning system;
send a message to a user using a messaging system, the message including a first uniform resource locator (URL) that can be used to access a document;
receive an indication that the document associated with the first URL has been accessed, wherein the indication comprises a second URL generated by the message scanning system that has analyzed the message, the second URL including a coded value that is encoded using the private key and wherein the coded value is included in the second URL as a query string parameter such that the second URL identifies the same document as the first URL and further identifies the message scanning system;
determine, based on the coded value, that the message scanning system has accessed the document, wherein to determine that the message scanning system has accessed the document, the instructions cause the one or more processors to decode the coded value using the public key and to determine an identity of the message scanning system based on the decoded coded value; and responsive to a determination that the message scanning system has accessed the document, modify a record associated with the document to indicate that the message scanning system has accessed the document.

12. The computing system of claim 11, wherein the messaging system comprises an email system.

13. The computing system of claim 11, wherein the coded value comprises an encoded hash of the first URL.

14. The computing system of claim 11, wherein the second URL comprises an encoded hash of the first URL appended to the first URL.

\* \* \* \* \*